Oct. 6, 1936.  L. H. BRINKMAN  2,056,155
TUBE AND ROD HARDENING AND STRAIGHTENING APPARATUS AND METHOD
Filed Oct. 1, 1931  7 Sheets-Sheet 1

INVENTOR
L. H. Brinkman
BY
Thomas Howe
ATTORNEY

Oct. 6, 1936.  L. H. BRINKMAN  2,056,155
TUBE AND ROD HARDENING AND STRAIGHTENING APPARATUS AND METHOD
Filed Oct. 1, 1931    7 Sheets-Sheet 4

L. H. Brinkman INVENTOR
BY Thomas Howe ATTORNEY

Oct. 6, 1936.                L. H. BRINKMAN                2,056,155
TUBE AND ROD HARDENING AND STRAIGHTENING APPARATUS AND METHOD
Filed Oct. 1, 1931                7 Sheets—Sheet 5

INVENTOR
L. H. Brinkman
BY
Thomas Howe
ATTORNEY

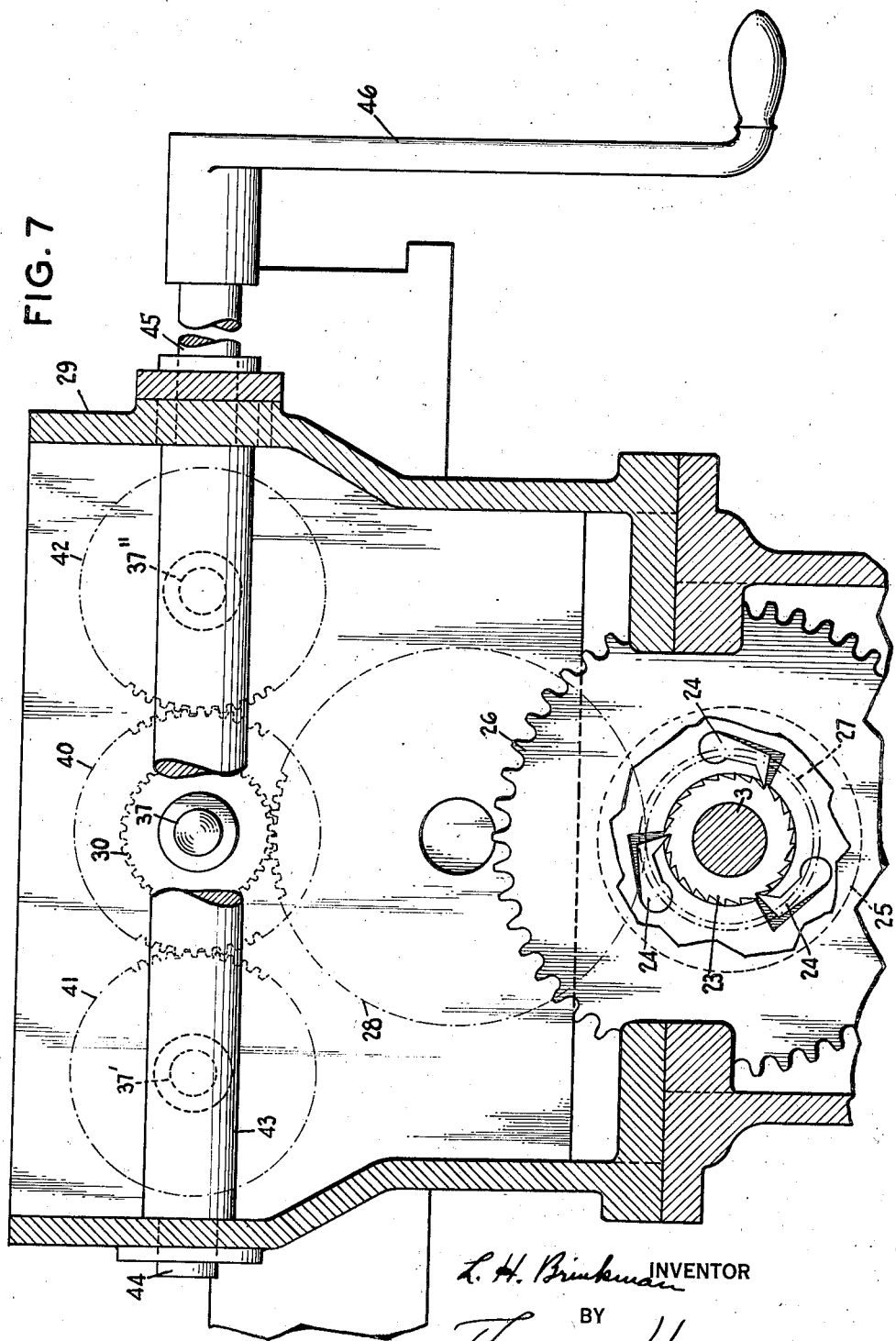

Oct. 6, 1936.  L. H. BRINKMAN  2,056,155
TUBE AND ROD HARDENING AND STRAIGHTENING APPARATUS AND METHOD
Filed Oct. 1, 1931  7 Sheets—Sheet 7

L. H. Brinkman INVENTOR
BY his ATTORNEY
Thomas Howe

Patented Oct. 6, 1936

2,056,155

UNITED STATES PATENT OFFICE 2,056,155

TUBE AND ROD HARDENING AND STRAIGHTENING APPARATUS AND METHOD

Louis H. Brinkman, Glen Ridge, N. J.

Application October 1, 1931, Serial No. 566,383

15 Claims. (Cl. 153—32)

This invention relates to hardening and straightening of shafts, the word "shafts" being intended to be generic to rods and tubes.

The invention is contemplated as being particularly useful in connection with tubular steel shafts for golf clubs, but it may have many other uses in which hardening or straightening or both of shafts is desired.

One object of the invention is to provide improved means for straightening metal shafts.

A further object of the invention is to provide improved means for tempering or hardening metal shafts.

A further object of the invention is to provide means whereby straightening and hardening or tempering of shafts may be carried out in one operation.

A further object of the invention is to provide means of the character indicated which shall be applicable to tapered shafts.

Other and ancillary objects of the invention will appear hereinafter.

In the accompanying drawings which illustrate the invention—

Fig. 7 is a section on the line 7—7 of Fig. 6, partly broken away to show the over-running clutch drive for the head stock chuck mechanism and the chuck-operating plunger;

Figure 1:
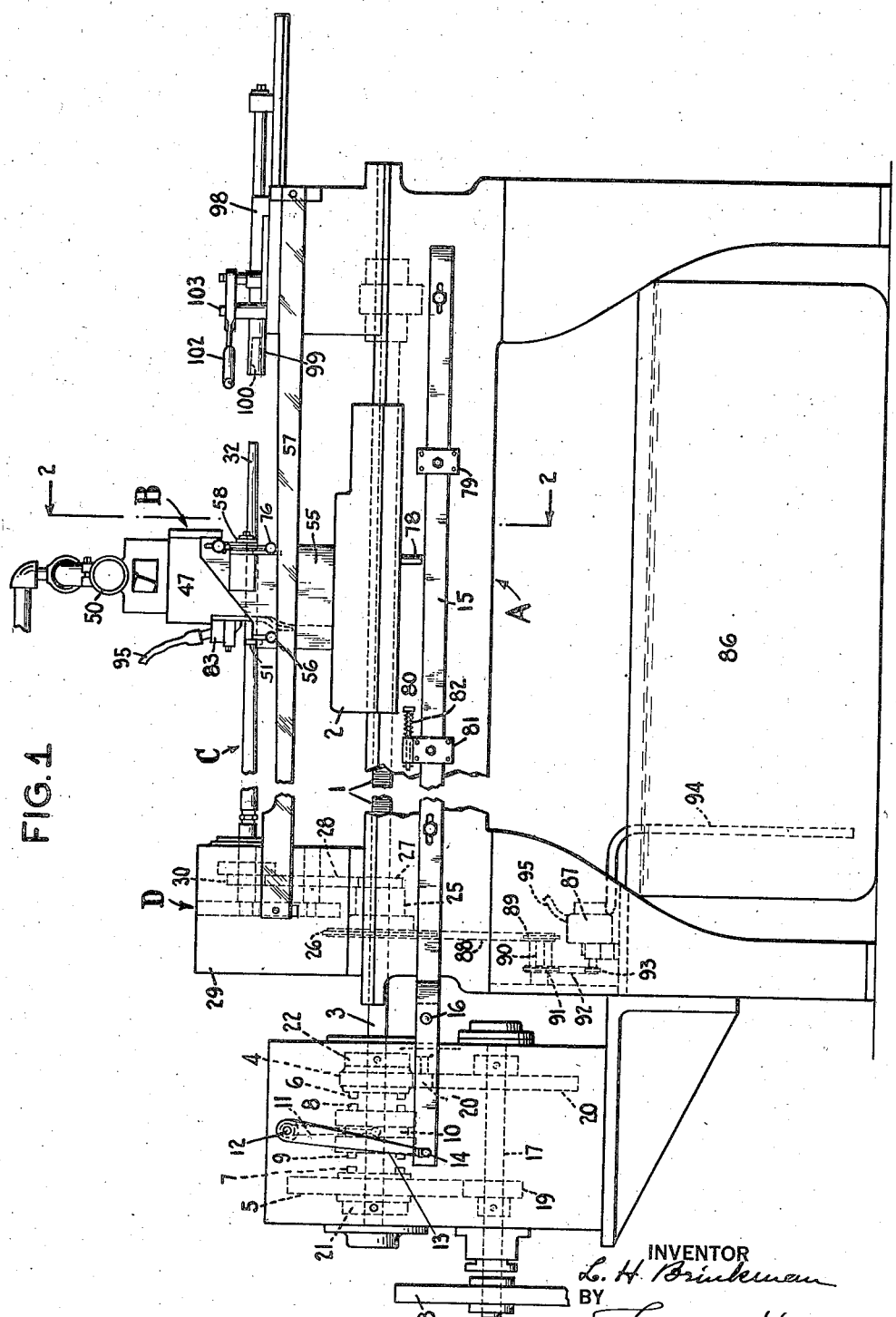
Fig. 1 is a side elevation of apparatus embodying the invention.
Figure 2:
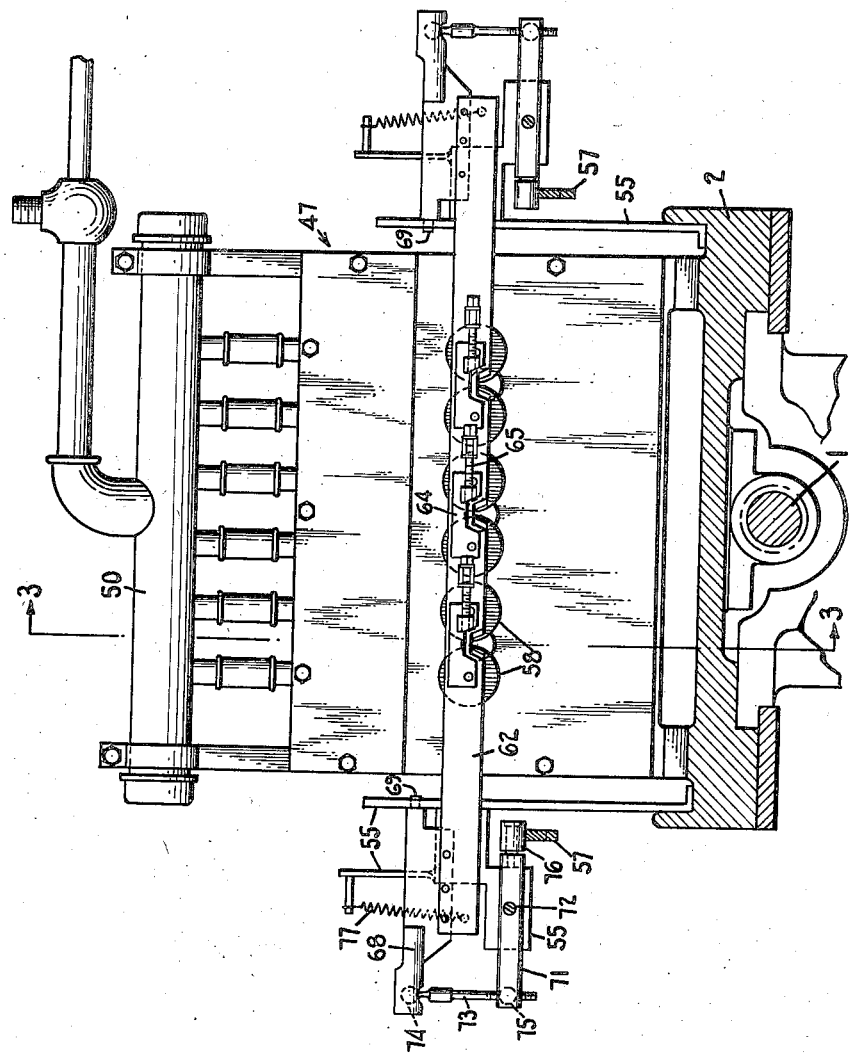
Fig. 2 is a section, on an enlarged scale, partly broken away, on the line 2—2 of Fig. 1.
Figure 3:
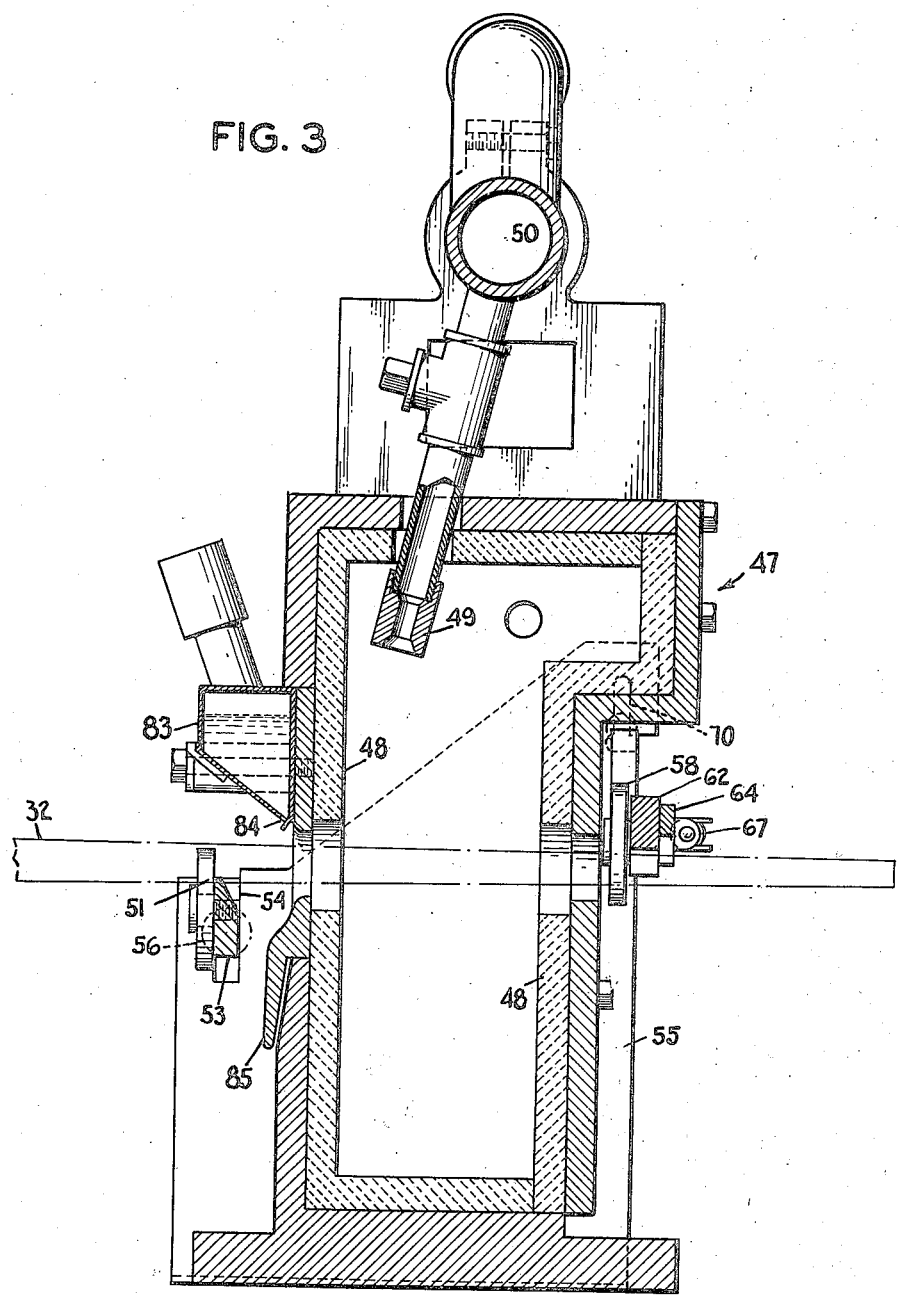
Fig. 3 is a section, on an enlarged scale, partly broken away, on the line 3—3 of Fig. 2.
Figure 4:
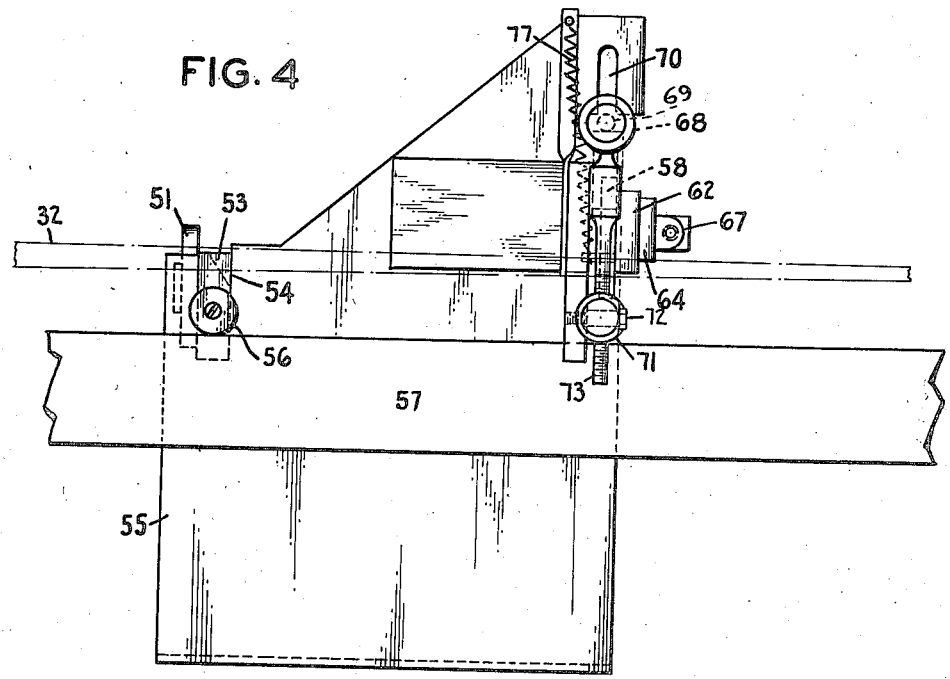
Fig. 4 is a fragmentary view, in side elevation, of a portion of the apparatus showing, in side elevation, the straightening roller, guide and supporting bracket at one side and the manner of cooperation of such rollers with their guiding cam, this figure being on an enlarged scale.
Figure 5:
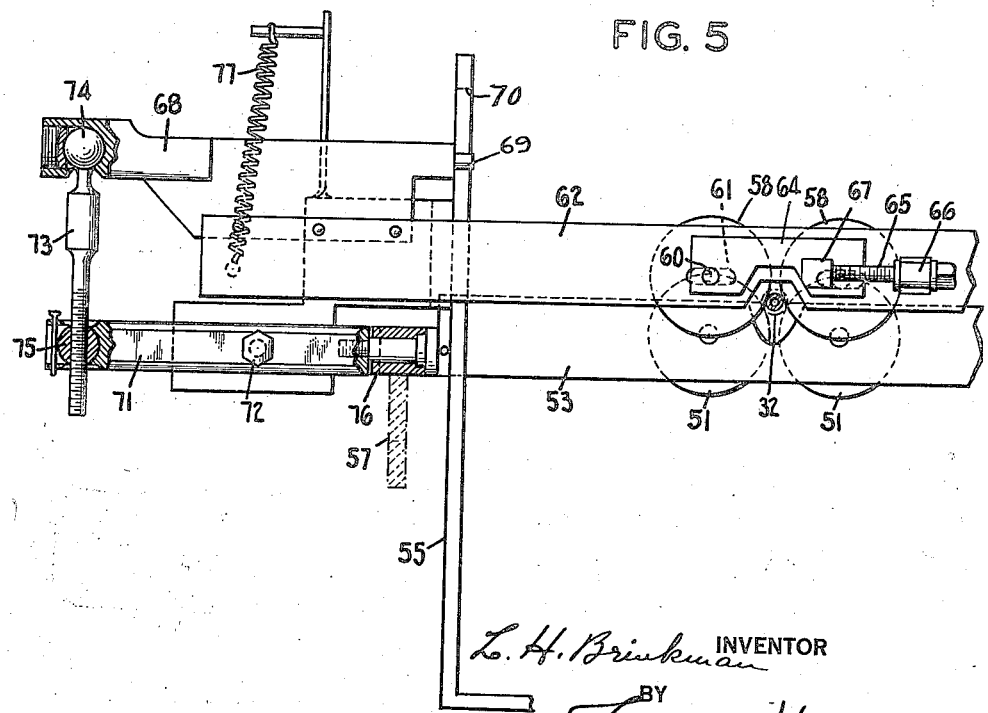
Fig. 5 is a fragmentary view, showing in elevation and partly in section, one end of the straightening roller carrying bars and particularly the means for operating the upper rollers by their adjusting cam, this view being to the same scale as Fig. 4 viewing the apparatus of Fig. 4 from the right hand.

Referring to the drawings, see Fig. 1 particularly, the apparatus generally comprises a bed or frame A along which a carriage carrying a furnace and straightening rests B is movable by means of a feed screw, the steel shafts C to be straightened and hardened passing through the furnace and against the rests, and being secured respectively in rotatable chucks in the head stock D.

Referring now in detail to the construction and operation, the feed screw 1 rotatably mounted in the frame, engages in a carriage 2 so that the carriage is moved in one direction or the other upon the frame according to the direction of turning of the feed screw. The feed screw shaft 3 has mounted upon it, so as to rotate thereon, except when clutched thereto as hereinafter referred to, the gears 5 and 4, the collars 21 and 22 pinned to the shaft forming abutments limiting the longitudinal movement of the gears 5 and 4 respectively upon the shaft 3, the gear 4 having the jaw clutch member 6 on one side and the gear 5 having the jaw clutch member 7 upon it. Splined upon the shaft 3 so as to turn therewith but to slide longitudinally thereon is the movable part having the clutch member 8 on one side and the clutch member 9 on the other side. This part also is provided with a groove 10 within which enters the operating fork 11 which permits relative rotation of the fork and clutch part but affords a means for shifting the movable clutch part longitudinally upon the shaft 3. The fork 11 is fixed upon the rotatable shaft 12 and also upon this shaft is fixed the clutch operating arm 13 having a pin 14 engaging in a slot in the longitudinally sliding clutch bar 15 operated by a handle 16, or it may be operated by the carriage 2 as will be hereinafter set forth.

The driving power is supplied to rotate the shaft 17 by means of the pulley wheel 18 fixed thereon or in any other suitable way. The shaft 17 has fixed upon it the gears 19 and 20 respectively driving the gears 5 and 4, the gear 19 meshing directly with the gear 5 but an idler gear 20′ is interposed between the gears 4 and 20 so that the gears 4 and 5 are driven in opposite directions. The gear ratios are such that when the clutch members 7 and 9 are in engagement the feed screw will be turned in one direction at a low rate of speed (driving the carriage 2 to the right see Fig. 1), and when the members 8 and 6 are in engagement the feed screw will be run in the other direction (driving the carriage to the left see Fig. 1) at a higher rate of speed.

The mechanism for securing the shafts to be straightened, in this case tubular, in the head stock and for rotating them comprises (see particularly Figs. 1, 6 and 7) a ratchet wheel 23 fixed upon the feed screw 3 and adapted to be engaged by the pawls 24 pivoted upon the member 25 rotatably mounted upon the feed screw shaft 3 and adapted to be driven in one direction by the pawl 24 and ratchet 23 (which forms an overrunning clutch), the pawls slipping over the ratchet wheel without driving the member 25 when the shaft 3 is turned in the opposite direction. The member 25 also has fixed upon it the sprocket wheel 26 for driving a pump as will be hereinafter referred to. It also carries gear teeth 27 meshing with the gear 28 rotatably mounted in the head stock housing 29 and meshing with the gear 30 fixed upon the rotatably mounted chuck holder 31.

The chuck for securing the tube 32 to be treated to the rotatable chuck holder comprises a tapered portion 33 driven into the corresponding tapered socket in the chuck holder, and a split sleeve 34 which tends to occupy a contracted position but which may be spread by means of a circular wedge 35 fixed upon the rod 36 which extends through the chuck and chuck holder and is fixed to a plunger 37 at the rear end of the chuck holder. This plunger tends to be forced to the rear by a spring 38 which operates to draw the wedge 35 into the split sleeve and expand the same. The wedge 35 may be moved in the other direction by pushing upon the rear end of the plunger 37 against the spring 38 when the slotted members of the sleeve 34 will spring inwardly.

It will be apparent that when the sleeve 34 is expanded it will come against the inner walls of the tube 32 to be treated, telescoped therewith, and grip the same so that the tube will turn with the chuck. When the split sleeve is permitted to contract, however, the grip upon the tube 32 will be released and the tube can be removed. In placing a tube in operative position it will be apparent that the end of the tube will be telescoped over the split sleeve 34 and the sleeve expanded to grip the tube. The nut 39 is screw-threaded upon the chuck 33 for the purpose of withdrawing the chuck from the chuck holder by screwing the nut 39 against the end of the chuck holder 31.

The quantity of work turned out in a given time and so the efficiency of the apparatus, may be increased by treating a number of tubes at one time and so a plurality of tube holding chucks may be provided (in this case three are shown) and the additional chucks are operated from the chuck already described by means of a gear 40 fixed upon the chuck holder 31 and meshing with the gears 41 and 42 on either side which are fixed on the respective chuck holders of the other chucks, the construction of those other chucks and chuck holders being identical with that already described.

Figure 6:
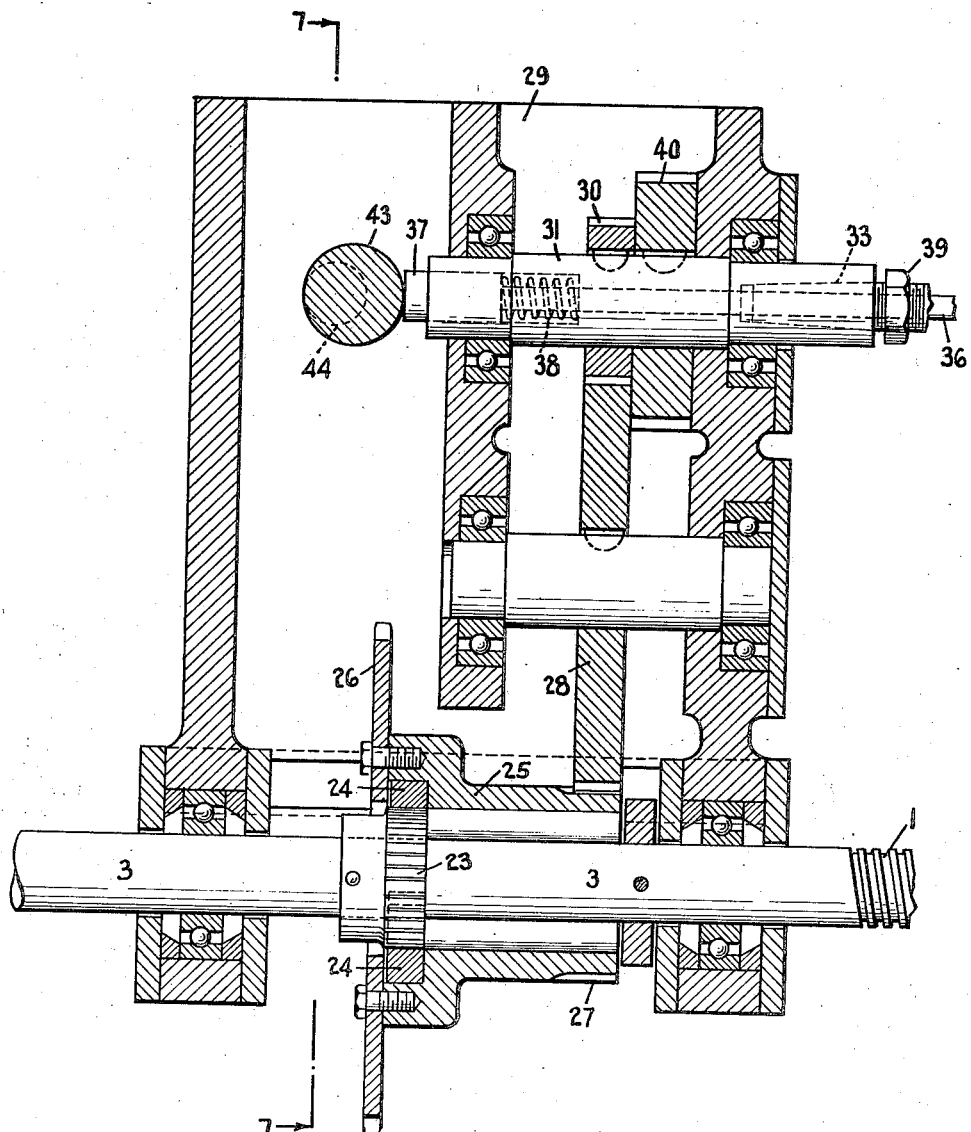
Fig. 6 is a longitudinal vertical central section, on an enlarged scale, through the head stock of Fig. 1.
Figure 8:
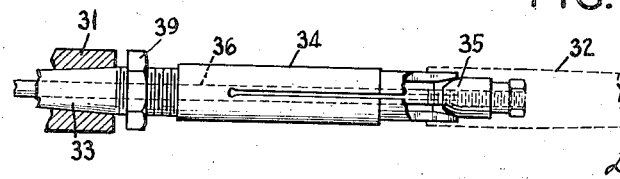
Fig. 8 is a fragmentary view showing a head stock chuck in side elevation and on an enlarged scale.

In order to press the plungers 37, 37' and 37" forwardly to release the chucks a shaft 43 is rotatably mounted in the head stock housing 29 by means of "off center" gudgeons 44 and 45 at its ends whereby the shaft 43 becomes a cam which, when turned into the position as shown in Fig. 6, operates to push the plungers 37, 37' and 37" forwardly to release the clutches. When the shaft 43 is turned into a position permitting the spring 38 to force the plungers rearwardly, the clutches assume their gripping positions. The shaft 43 may be turned to operate the clutches as described, by means of a handle 46 secured to the gudgeon 45.

The tubes 32 to be treated pass through a furnace 47 mounted upon the carriage 2, the furnace being lined with suitable heat insulation 48 and heated by burners 49 communicating with the manifold 50 supplied with a suitable combustible mixture of gas and air. The flame of the burners, however, should not be directed against the tubes as it might injure them.

To straighten the tubes 32 being treated there is provided on the clutch side of the furnace a pair of rollers 51 adapted to engage with the bottom of the tube and a pair of rollers 58 upon the opposite side of the furnace, adapted to engage with the upper surface of the tube. In order to provide a pair of rollers 51 for engagement with each of the several tubes being simultaneously operated upon (in this case three) there are a plurality of pairs of rollers 51, one pair for engagement with the lower side of each tube, rotatably mounted in the flat bar 53 which is adapted to move up and down, its ends moving in slots 54 in brackets 55 fixed to the carriage 2, said bar 53 having at its ends rollers 56 rolling upon the top surface of guide or cam bars 57 fixed to the stationary frame of the apparatus and having their top surfaces so tapered as to correspond with (but of a reverse inclination) the desired taper of the treated tube.

At the opposite side of the furnace from the clutch a pair of rollers 58, to bear upon the top of each treated tube is provided. The pintle 60 upon which each of such rollers is rotatably mounted, extends through a slot 61 in a flat bar 62, the ends of such pintles of each pair of rollers being mounted in a plate 64 movable longitudinally of the bar 62 by a member 65 rotatably mounted in a lug 66 on the bar 62 and in screw-threaded engagement with the lug 67 on the plate 64. Turning of the member 65 will shift the plate 64 lengthwise of the bar 62 and move the rollers in one direction or the other according to the direction of the turning of the member 65, the pintles 60 sliding in the slots in the bar 62. This affords a means of adjusting the pairs of rollers 58 laterally to properly aline with the rollers 51. The bar 62 carrying the rollers 58 is secured at its ends to the vertically moving members 68 having projections 69 guided in vertical slots 70 in the brackets 55. The members 68 are connected with members 71 pivoted at 72 on the brackets 55 by a link 73 connected with the members 68 at one end by the ball and socket joint 74 and with the members 71 by ball and socket joint 75. At their inner ends the members 71 carry rollers 76 bearing upon the top of the guide or cam bars 57. Springs 77 secured at one end to the brackets 55 and at their other ends to the bar 62 tend to raise that bar. As the cam bars 57 raise the rollers 76 the bar 62 will be forced downwardly.

The carriage 2 carries a projection 78 which, at the right hand end of the travel of the carriage (Fig. 1) when the treatment of the tube will have been completed, comes against the clamp 79 fixed upon the clutch shift bar 15 and disengages the clutch faces 7 and 9 thereby stopping the rotation of the feed screw and of the chucks. This permits the removal of the treated tubes and the insertion of tubes to be treated. The clutch bar 15 may then be shifted to the right (Fig. 1) by the handle 16 when the clutch faces 6 and 8 will be brought into engagement, and the feed screw will be rotated at a high speed to move the carriage 2 on its return stroke, i. e. toward the head stock. When the limit of its return movement has been reached the projection 78 on the carriage will come against the end of the bolt 80 sliding in a bracket 81 fixed on the clutch shift bar 15 and spring pressed to the right (Fig. 1) by a spring 82. The projection 78 will move the bolt 80 against the spring, compressing the latter, until the spring has been fully compressed and the projection 78 pushes rigidly against the bracket 81. The clutch surfaces 6 and 8 will then be disengaged when the spring 82 will throw the faces 7 and 9 into engagement. This will reverse the feed screw and cause the chucks to be rotated (they not having been rotated on the return movement of the carriage) and the apparatus will proceed at a lower speed in its treating or forward stroke.

It will be seen from the foregoing that in the case of each tube treated, the pairs of rollers bearing against its lower and upper sides respectively will assume positions at any instant requiring the tube to assume its desired conformation, and the tube is made readily conformable to this conformation by the rollers because of being heated by the furnace between the pairs of rollers. This heating of the tube would be liable to destroy the temper or hardness of steel tubes so treated even if they were of the proper temper and hardness previously. In any event the treatment of the tube for straightening it may be availed of for causing the treated tube to have the desired temper or hardness by causing the tube to be heated to the proper amount and then chilled upon its exit from the furnace. Accordingly water cooling means is provided for each of the tubes, comprising a water reservoir 83 mounted above the tubes 32 on the chuck side of the furnace and having openings 84 through which water may issue upon the tubes beneath, thereby chilling the tubes as they emerse from the furnace, the water then passing over the aprons 85 into a tank 86 from which it may be pumped into the reservoir 83 by means of a rotating pump 87 driven from the sprocket wheel 26 by means of a sprocket chain 88 meshing with a sprocket wheel 89 fixed upon a shaft 90 journaled in the frame of the machine. Also fixed upon the shaft 90 is a sprocket wheel 91 by which a sprocket chain 92 is connected with the sprocket wheel 93 fixed upon the shaft of the pump 87. The water is raised from the tank 86 through the suction pipe 94 and then forced through the pipe 95 into the receptacle 83.

It will now be understood that the carriage 2 having reached the right hand end (Fig. 1) of its travel, the clutch shift bar 15 will throw the movable part having the clutch members 8 and 9 into its neutral position when the mechanism will stop. The treated tubes may then be freed from the head stock clutches and removed. New tubes to be treated are then placed in position and secured in the clutches. The clutch shift bar 15 is then thrown to the right (Fig. 1) by means of the handle 16, when the high speed drive of the feed screw will be thrown into operation and the carriage will be moved toward the left. During this return movement of the carriage neither the chucks nor the pump will be driven as the ratchet 23 will be driven in the direction such that the pawls 24 will slip over its teeth. The speed of the carriage in this movement will be sufficiently great so that the heat of the furnace will not act deleteriously upon the tubes to be treated. The left hand (Fig. 1) travel of the carriage having been reached, the movable clutch part will be shifted so that the clutch parts 6 and 8 will be disengaged, thereby removing the driving connection for driving the carriage 2 to the left, and the clutch parts 7 and 9 will be brought into engagement, thereby bringing into operation the lower speed drive for moving the carriage to the right (Fig. 1). The direction of turning of the feed screw 3 will now be the reverse of that during the movement just completed so that the ratchet 23 will engage its pawls and rotate the chucks to which the tubes to be treated are secured and also drive the pump for supplying water as before referred to. It will thus appear that the return stroke of the carriage toward the head stock at a high speed having been completed, the apparatus will be automatically shifted so that the working stroke of the carriage will be automatically initiated and at the same time the rotations of the tubes and the supply of water will be started. The carriage will then continue its movement toward the right, the rests or rollers on either side of the furnace, bearing upon each tube and being moved radially inwardly of the tube as the carriage moves to the right, in accordance with the desired taper, and these rests are positively driven and held in positions corresponding to that taper, so that the tube resting upon them is obliged to conform to such taper and be axially straight. The heating of the tubes between the rests enables the tube to readily assume the form as limited by the rests. As above pointed out this heating may be such that, when the tubes are chilled by the water on emerging from the furnace a proper temper and hardness will be attained.

The carriage 2 having thus proceeded to the right hand (Fig. 1) end of its travel the driving clutch will be thrown out by the projection 78 on the carriage coming against the clamp 79 on the clutch shift bar and the carriage will come to rest whereupon the treated shafts may be removed and the shafts to be treated may be placed in position, the clutch shift bar thrown to the right and the operation repeated.

Figure 9:
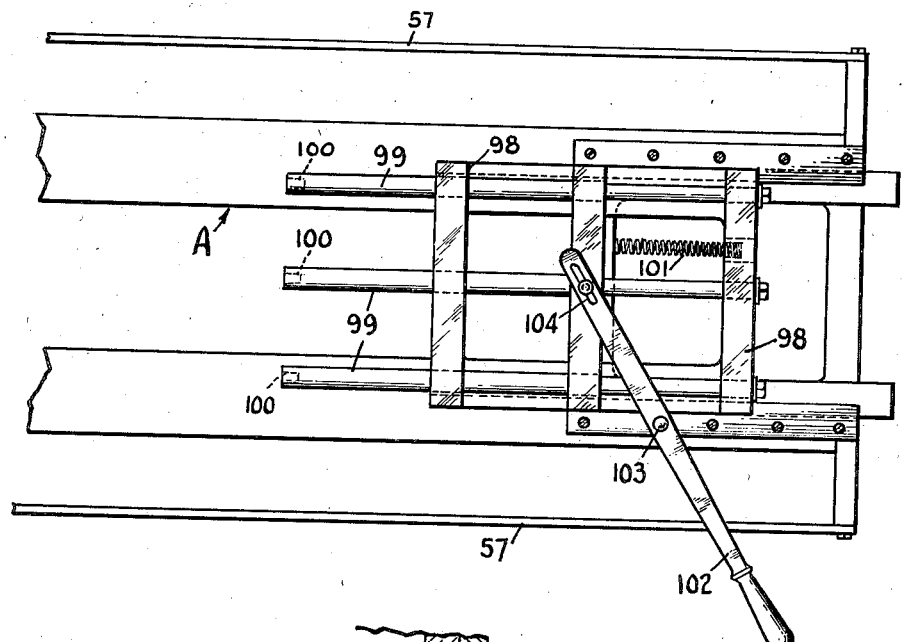
Fig. 9 is a top plan view of the right hand (Fig. 1) of the apparatus showing a special work holder.
Figure 10:
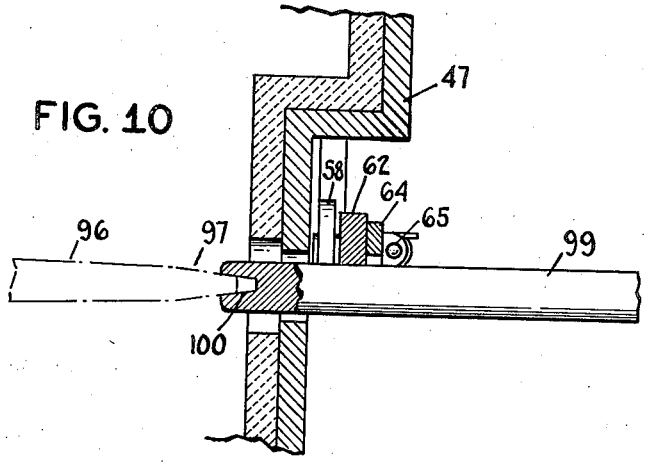
Fig. 10 is a fragmentary view showing a part, on a smaller scale, of the section of Fig. 3 showing the relation of the special holder thereto and to the work.

In some forms of golf shafts (see Fig. 10) the shaft 96 has a more sharply tapered, swaged end 97 for securing to the head of the golf club. In order to straighten this tapered end into axial alignment with the shaft as this end of the shaft is heated in the furnace, when the furnace is substantially at the right hand (Fig. 1) of its travel, a special holding and aligning means may be provided. Thus, referring to Figs. 1, 9 and 10, there is provided adjacent the right hand end (Fig. 1) of the apparatus a carriage 98 sliding upon the frame A. Fixed upon the carriage 98 are three bars 99 each having a tapered socket 100, each of which sockets is in axial alignment with the straightened tube as defined by the pairs of straightening rollers 51 and 58. The carriage 98 is normally held in retracted position, when it is out of engagement with the tubes, by means of a spring 101 interposed between the frame A and the carriage 98. Just before the carriage 2 reaches the right hand (Fig. 1) of its travel so that the ends of the tubes having swaged, more steeply inclined tapers 97 are within the furnace, the carriage 98 may be moved towards the work, against the force of the spring 101, by means of a hand lever 102 pivoted on the frame A at 103 and having a pin and slot connection 104 with the carriage 98. When the carriage is thus advanced toward the tubes, the ends of the bars 99 having the sockets 100 are entered past the rest rollers 58 into the furnace and the respective recesses 100 receive within them the steeply tapered ends 97 as shown in Fig. 10. These steeply tapered ends, while heated by the furnace, are thus aligned with the axis of the shaft. This alignment is quickly accomplished when the handle 102 may be released. The spring 101 will then retract the carriage 98 and, the carriage 2 having reached the end of its travel, the tube may be removed from the apparatus.

While the invention has been illustrated in what is considered its best application, it may have other embodiments without departing from its spirit and is not therefore limited to the structures shown in the drawings.

What I claim is:

1. The combination with longitudinally spaced rests, of means for relatively moving a shaft and said rests endwise of said shaft, said rests being on opposite sides of the axis of said shaft and means for causing said rests to move in opposite directions radially of said shaft by distances bearing predetermined relations to the longitudinal movement of the shaft.

2. The combination with longitudinally spaced rests, of means for relatively moving a shaft and said rests endwise of said shaft, said rests being on opposite sides of said shaft, means for relatively rotating said shaft and rests, means for heating said shaft between said rests and means for causing said rests to move in opposite directions radially of said shaft.

3. The combination with longitudinally spaced sets of rollers, of means for relatively moving a shaft and said rollers endwise of said shaft, means for relatively rotating said shaft and the axes of said rollers and means for heating said shaft between said sets of rollers.

4. The combination with longitudinally spaced sets of rollers, of means for relatively moving a shaft and said rollers endwise of said shaft and means for causing one or more of said sets of rollers to move radially of said shaft by distances bearing predetermined relations to the relative longitudinal movement of the shaft and rollers.

5. The combination with longitudinally spaced sets of rollers, of means for relatively moving a shaft and said rollers endwise of said shaft, said rollers being on opposite sides of the axis of said shaft and means for causing said sets of rollers to move in opposite directions radially of said shaft by distances bearing predetermined relations to the relative longitudinal movement of the shaft and rollers.

6. The combination with longitudinally spaced sets of rollers, of means for relatively moving a shaft and said rollers endwise of said shaft, said sets being on opposite sides of said shaft, means for relatively rotating said shaft and said sets of rollers, means for heating said shaft between said sets of rollers and means for causing said sets to move in opposite directions radially of said shaft.

7. The combination with a furnace, of means for relatively moving a shaft and said furnace through which said shaft passes, endwise of said shaft, means for relatively rotating said shaft and furnace and means for chilling successive sections of said shaft as they emerge from said furnace.

8. In an apparatus for straightening shafts, the combination with a carriage having longitudinally displaced rests adapted to bear upon opposite sides of a shaft operated upon, means for driving said carriage longitudinally of said shaft, and means controlled by the position of said carriage for controlling said driving means.

9. In an apparatus for straightening shafts, the combination with a carriage having longitudinally displaced rests adapted to bear upon opposite sides of a shaft operated upon, means for driving said carriage longitudinally of said shaft, means for rotating said shaft, and means controlled by the position of said carriage for controlling all of said means.

10. In an apparatus for straightening and hardening shafts, the combination with a carriage having longitudinally displaced rests adapted to bear upon opposite sides of a shaft operated upon, means for heating the shaft between said rests, means for driving said carriage longitudinally of said shaft, means for rotating said shaft, means for chilling said shaft, and means controlled by the position of said carriage for controlling said carriage driving, shaft rotating and chilling means.

11. In an apparatus for straightening shafts, the combination with a carriage having longitudinally displaced rests adapted to bear on opposite sides of a shaft operated upon, means for driving said carriage longitudinally of said shaft and means operated by said carriage at one end of its travel for disconnecting said driving means.

12. In an apparatus for straightening shafts, the combination with a carriage having longitudinally displaced rests adapted to bear on opposite sides of a shaft operated upon, means for driving said carriage longitudinally of said shaft and means operated by said carriage at one end of its travel for reversing the direction of driving of said carriage by said driving means.

13. The method of straightening a tapered shaft which consists in relatively moving, endwise of the shaft, the shaft and longitudinally displaced rests bearing upon opposite sides of the shaft, relatively rotating the shaft and rests during such movement and radially moving said rests during said relative longitudinal movement of said rests and shaft, said radial movement corresponding with the taper of the shaft.

14. The method of straightening a tapered shaft which consists in relatively moving, endwise of the shaft, the shaft and longitudinally displaced rests bearing upon opposite sides of the shaft, relatively rotating the shaft and rests during such movement and radially moving said rests during said relative longitudinal movement of said rests and shaft, said radial movement corresponding with the taper of the shaft and heating the shaft between the rests.

15. The method of straightening and hardening shafts which consists in relatively moving, endwise of the shaft, the shaft and longitudinally displaced rests bearing upon opposite sides of the shaft, the shaft and rests being relatively rotated during such movement and radially moving said rests during said relative longitudinal movement of said rests and shaft, said radial movement corresponding with the taper of the shaft, heating the shaft between the rests and chilling the shaft after it emerges from said rests.

LOUIS H. BRINKMAN.